US008687193B2

(12) United States Patent
Dahlgren et al.

(10) Patent No.: US 8,687,193 B2
(45) Date of Patent: Apr. 1, 2014

(54) COLOR MEASUREMENT DEVICE

(75) Inventors: Brett E. Dahlgren, Albany, OR (US); Stephan R. Clark, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 323 days.

(21) Appl. No.: 13/126,297

(22) PCT Filed: Oct. 31, 2008

(86) PCT No.: PCT/US2008/082126
§ 371 (c)(1), (2), (4) Date: Apr. 27, 2011

(87) PCT Pub. No.: WO2010/050978
PCT Pub. Date: May 6, 2010

(65) Prior Publication Data

US 2011/0211196 A1 Sep. 1, 2011

(51) Int. Cl.
*G01J 3/46* (2006.01)

(52) U.S. Cl.
USPC .......................................... 356/402; 356/425

(58) Field of Classification Search
USPC ................................. 356/300–334, 402–425
See application file for complete search history.

(56) References Cited

U.S. PATENT DOCUMENTS

| | | | | |
|---|---|---|---|---|
| 6,147,761 | A * | 11/2000 | Walowit et al. | 356/425 |
| 6,295,405 | B1 | 9/2001 | Jannson et al. | |
| 6,370,406 | B1 * | 4/2002 | Wach et al. | 600/310 |
| 6,621,576 | B2 * | 9/2003 | Tandon et al. | 356/320 |
| 6,898,381 | B2 | 5/2005 | Maebashi et al. | |
| 7,072,034 | B2 | 7/2006 | Rosengaus et al. | |
| 7,352,510 | B2 | 4/2008 | Cummings et al. | |
| 2004/0056264 | A1 | 3/2004 | Hisano | |
| 2004/0156047 | A1 | 8/2004 | Nakayama | |
| 2005/0083530 | A1 | 4/2005 | Ogihara et al. | |
| 2005/0147135 | A1 | 7/2005 | Kurtz et al. | |
| 2009/0279092 | A1 * | 11/2009 | Tsao | 356/402 |
| 2010/0044441 | A1 * | 2/2010 | Cohen et al. | 235/469 |

FOREIGN PATENT DOCUMENTS

| | | |
|---|---|---|
| JP | 2002168697 A | 6/2002 |
| JP | 2004109051 | 4/2004 |
| JP | 2005127792 | 5/2005 |

OTHER PUBLICATIONS

International Search Report, PCT Application No. PCT/US2008/082126, Filed Oct. 31, 2008. Korean IPO, Report dated May 29, 2009.

* cited by examiner

*Primary Examiner* — Gregory J Toatley
*Assistant Examiner* — Hina F Ayub

(57) ABSTRACT

A color measurement device includes a light pipe and a light source. The light pipe is oriented length-wise towards a color sample surface along a first axis that is non-perpendicular to the surface. A color sample is positioned on the surface. The light pipe has a near opening, a far opening, and a face at the far opening. The near opening is closer to the color sample than the far opening. The light source is positioned near the far opening of the light pipe, and is to output light along a second axis and into the light pipe at the far opening. The light reflects off the surface after exiting the light pipe at the near opening. The second axis is non-perpendicular to the face of the light pipe at the far opening. The light non-uniformly illuminates the color sample after exiting the light pipe at the near opening.

13 Claims, 6 Drawing Sheets

COLOR MEASUREMENT DEVICE

BACKGROUND

Color measurement is employed in a variety of different situations. For example, full-color printing devices typically have their color output calibrated to achieve better quality full-color printing. To calibrate the color output of such printing devices, the color output is typically measured. Imprecision as to how color is measured can, however, affect the accuracy of the color measurement, which can affect color calibration, which in turn can affect the quality of full-color printing.

DETAILED DESCRIPTION

Figure 1:
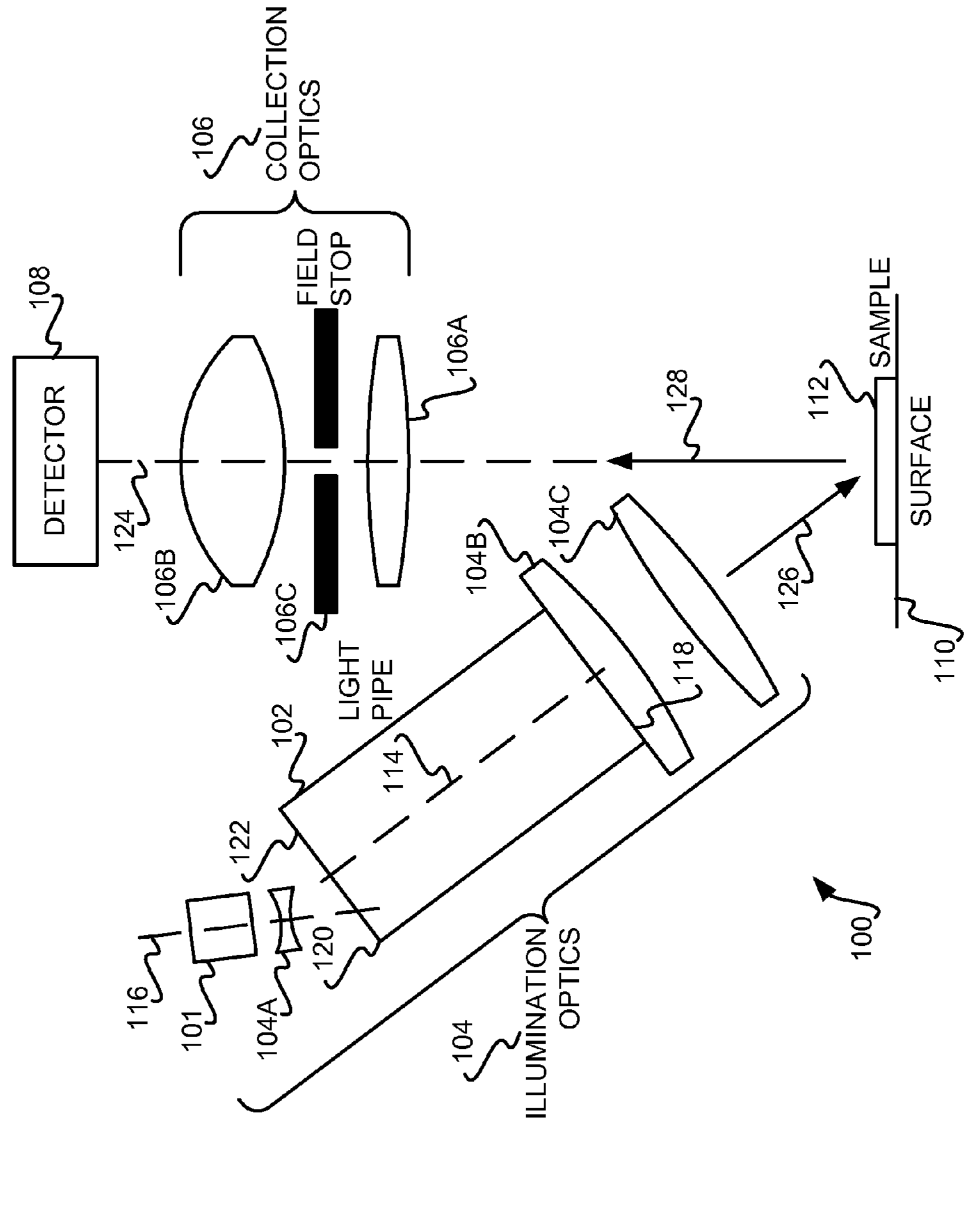
FIG. 1 is a diagram of a color measurement device, according to an embodiment of the present disclosure.
Figure 2:
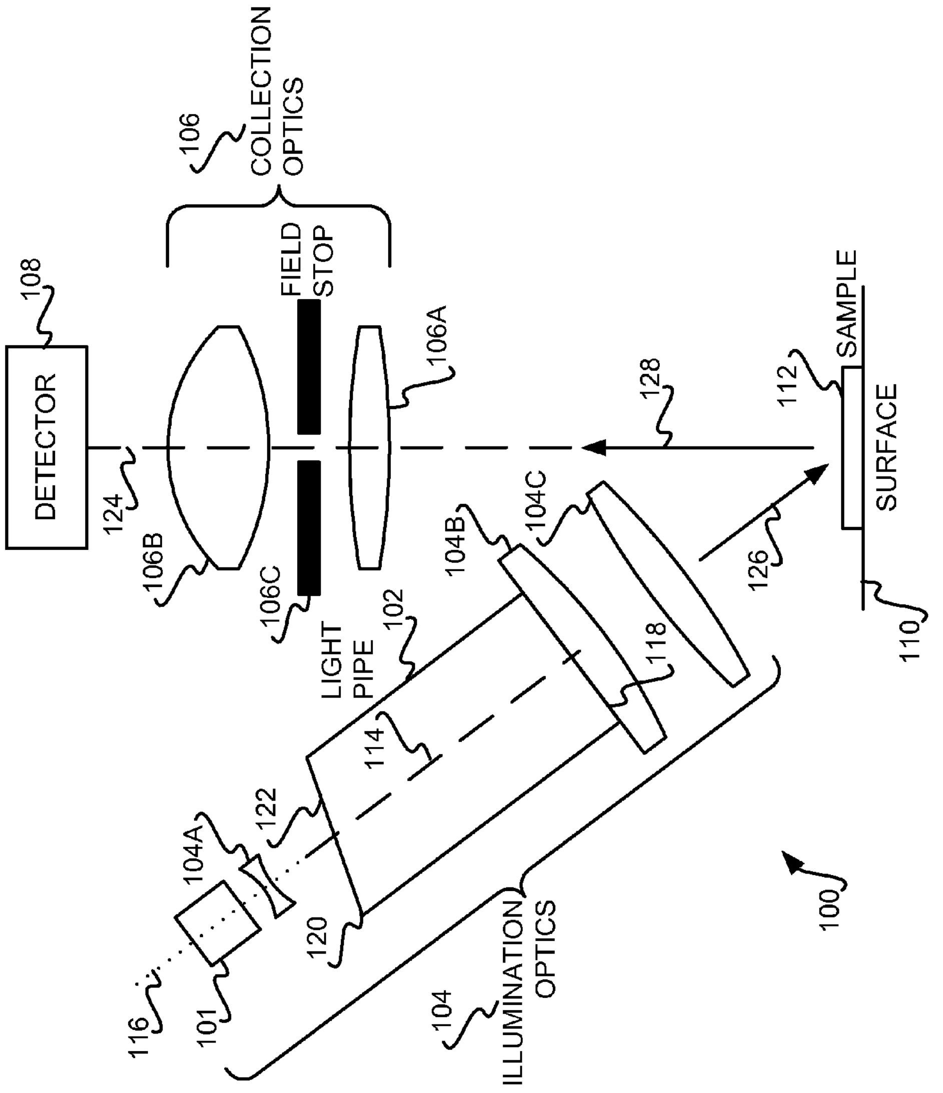
FIG. 2 is a diagram of a color measurement device, according to another embodiment of the present disclosure.

FIGS. 1 and 2 show a color measurement device 100, according to different embodiments of the disclosure. The color measurement device 100 includes a light source 101, a light pipe 102, illumination optics 104, collection optics 106, and a light detector 108. The illumination optics 104 can include lenses 104A, 104B, and 104C, whereas the collection optics 106 can include lenses 106A and 106B, as well as a field stop 106C.

Light output by the light source 101 is directed via the illumination optics 104 through the light pipe 102 and towards a color sample 112 on a color sample surface 110, as indicated by the arrow 126. The light is reflected off the color sample 112 and travels through the collection optics 106 until the light reaches the light detector 108. The light detector 108 positioned (i.e., disposed) above the collection optics 106 detects the power of the light reflected off the color sample 112.

The color sample 112 may be a sample spot of colorant printed by a printing device onto a media sheet, such that the surface 110 is a surface of the media sheet. For example, the colorant may be ink where the printing device is an inkjet-printing device. As another example, the colorant may be toner where the printing device is a laser-printing device. Other types of color samples are also amenable to having their color measured by the color measurement device 100.

The light pipe 102 has a near opening 118 and a far opening 120. The near opening 118 is closer to the color sample 112 than the far opening 120 is. The light pipe 102 has a face, or edge, 122 at the far opening 120. The light source 101 is positioned near (e.g., at) the far opening 120 of the light pipe 102. The light pipe 102 is oriented length-wise towards the color sample 112 along an axis 114 that is non-perpendicular to the color sample surface 110. For example, the axis 114 may be at an angle of forty-five degrees to the color sample surface 110 in one embodiment.

The collection optics 106 are disposed above the color sample surface 110 along an axis 124 that is at least substantially perpendicular to the color sample surface 110. The collection optics 106 are fixably disposed along the axis 124 to nominally focus on the color sample 112 positioned on the color sample surface 110. The light source 101 is positioned along an axis 116, such that the light output by the light source 101 travels along the axis 116. It is noted that the lenses 104B and 104C of the illumination optics 104 are positioned (i.e., disposed) along the axis 114. By comparison, the lens 104A of the illumination optics 104 is positioned (i.e., disposed) along the axis 116.

In FIG. 1, the light source 101 is positioned near the far opening 120 of the light pipe 102 such that the second axis is non-parallel to and non-coincident with the axis 114. In one embodiment, the axis 116 may make an angle of two degrees with the axis 114. In this embodiment, the face 122 at the far opening of the light pipe 102 is at least substantially perpendicular to the axis 114, and thus is at least substantially perpendicular to the length of the light pipe 102.

By comparison, in FIG. 2, the light source 101 is positioned near the far opening 120 of the light pipe 102 such that the axis 116 is parallel to and coincident with the axis 114. However, in this embodiment, the face 122 at the far opening 120 of the light pipe 102 is non-perpendicular to the axis 114 (and therefore to the axis 116 as well), and thus is non-perpendicular to the length of the light pipe 102. The face 122 may in one embodiment make an angle of several degrees with the axis 114 (and therefore with the axis 116 as well).

In both FIGS. 1 and 2, then, the axis 116 is non-perpendicular to the face 122 of the light pipe 102 at the far opening 120. In FIG. 1, this is because the axis 116 is not parallel to the axis 114, while the face 122 is at least substantially perpendicular to the axis 114. In FIG. 2, this is because the face 122 is non-perpendicular to the axis 114, and the axis 116 is parallel to the axis 114.

Figure 3:
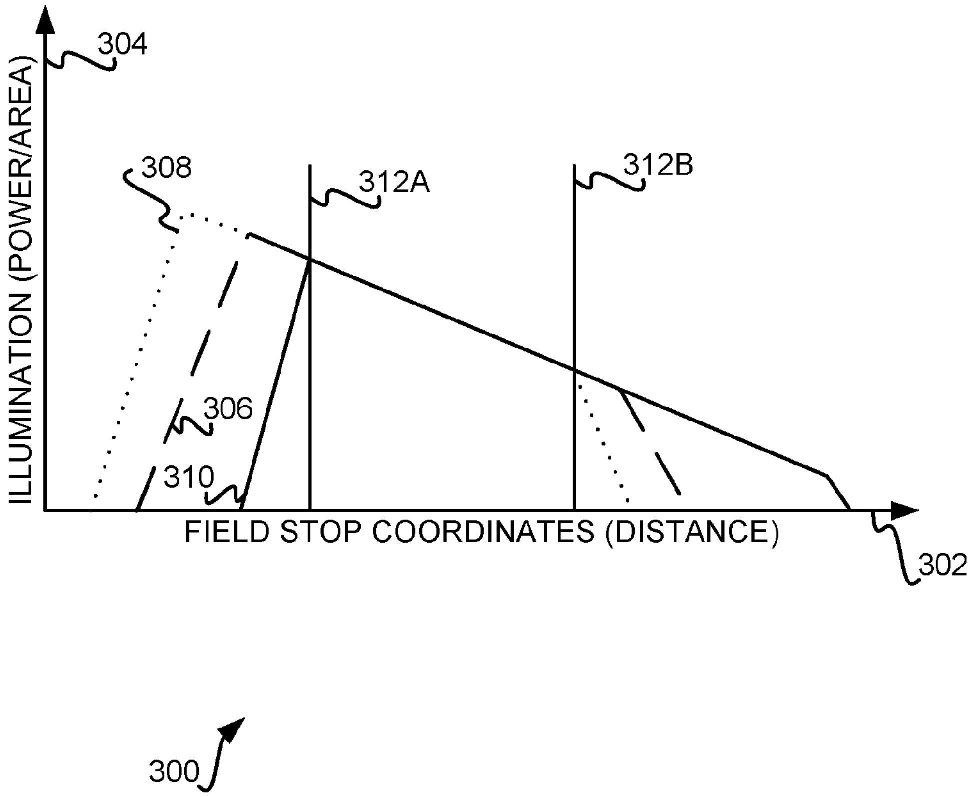
FIG. 3 is a graph depicting non-uniform illumination of a color sample in accordance with the color measurement device of FIG. 1 or FIG. 2, according to an embodiment of the disclosure.

FIG. 3 shows a graph 300 depicting illumination of the color sample 112 as a function of the field stop coordinates (i.e., distance parallel to the color sample surface 110) with respect to the color measurement device 100 of FIGS. 1 and 2, according to an embodiment of the disclosure. The x-axis 302 denotes units of length or distance, such as millimeters. By comparison, the y-axis 304 denotes units of illumination, which can be expressed as power per unit of area, such as lumens or watts per millimeters-squared.

There are three lines depicted in FIG. 3: a dashed line 306, a dotted line 308, and a solid line 310. It is noted that the lines 306, 308, and 310 at least substantially overlap one another between points 312A and 312B, collectively referred to as the points 312, which are the distance coordinates defining the opening of the field stop 106C parallel to the color sample surface 110. The lines 306, 308, and 310 correspond to different relative positions of the color sample 112 on the color sample surface 110 relative to the collection optics 106.

For example, the dashed line 306 may correspond to a first position of the color sample surface 110 in relation to the collection optics 106. By comparison, the dotted line 308 may correspond to a second position of the color sample surface 110 in relation to the collection optics 106, where the second position is closer to the collection optics 106 as compared to the first position. Likewise, the solid line 310 may correspond to a third position of the color sample surface 110 in relation to the collections optics 106, where the third position is farther from the collection optics 106 as compared to the first position.

There are two aspects of the graph 300 that are of note. First, the color sample 112 on the color sample surface 110 is non-uniformly illuminated by the light output by the light source 101 through the light pipe 102 via the illumination optics 104. That is, the illumination of the color sample 112 closer to the field stop coordinate at point 312A is greater than the illumination of the color sample 112 closer to the field stop coordinate at point 312B. Stated another way, the lines 306, 308, and 310 denoting illumination of the color sample 112 has a non-zero slope between the points 312.

Second, the light reflected off the color sample 112 and transmitted through the collection optics 106 results in the light detector 108 detecting the same amount of power regardless of the position of the collection optics 106 relative to the color sample 112. In the graph 300, the power of the light detected by the light detector 108 is proportional to the area under each of the lines 306, 308, and 310 between the field stop coordinates denoted by points 312. Because the lines 306, 308, and 310 are coincident between the points 312, the area under the lines 306, 308, and 310 between the points 312 is at least substantially identical for all three lines 306, 308, and 310. As such, the power of the light detected by the light detector 108 is at least substantially identical regardless of where the color sample 112 is positioned relative to the collection optics 106 as specified by the dashed line 306, the dotted line 308, or the solid line 310.

Stated another way, then, the power of the light reflected off the color sample 112 and collected by the collection optics 106, as detected by the light detector 108, is at least substantially independent of the position of the color sample 112 relative to the collection optics 106 along the axis 124 over a given distance shift relative to the nominal operation position for the color sample 112 relative to collection optics 106 Even if the color sample 112 is relatively far away from the collection optics 106, due to presentation of the sample 112 in relation to the optics 106 (and vice-versa), the power detected by the light detector 108 remains the same. This is indicated by the area under the solid line 310 between the points 312 being at least substantially equal to the area under the dashed line 306 between the points 312. Likewise, even if the collection optics 106 is relatively close to the color sample 112, due to presentation of the optics 106 in relation to the sample 112 (and vice-versa), the power detected by the light detector 108 remains the same. This is indicated by the area under the dotted line 308 between the points 312 being at least substantially equal to the area under the dashed line 306 between the points 312.

Advantages of the embodiments of FIGS. 1 and 2, which provide for non-uniform illumination of the color sample 112, as well as light power detection by the light detector 108 that is at least substantially independent of the position of the collection optics 106 in relation to the sample 112 along the axis 124, are now described. The problem faced by the inventors is the imprecision in measuring color. In particular, this imprecision manifests itself by the position of the collection optics 106 along the axis 124 in relation to the color sample 112. It is desirable to have the light power detected by the light detector 108 be robust in the face of this imprecision, and thus be robust with respect to the position of the collection optics 106 vis-à-vis the color sample 112 along the axis 124.

For instance, in general the collection optics 106 may be designed so that the optics 106 are situated in a fixed position along the axis 124 to nominally focus on the color sample 112 on the color sample surface 110—such that there is a nominal distance between the optics 106 and the sample 112 on the surface 110. However, in actuality, the distance between the collection optics 106 and the color sample 112 varies in practice. For example, if the color sample surface 110 is the surface of a media sheet, like paper, imprecision in how the sheet is delivered through the printing device can cause the surface 110 to be slightly farther away from or slightly closer to the collection optics 106 than the nominal distance. Likewise, manufacturing and other variations may result in the collection optics 106 not be perfectly situated in the designed-for fixed position along the axis 124. In such situations, the collection optics 106 are slightly out-of-focus in relation to the color sample 112 on the color sample surface 110.

The number of different ways and combinations that the light pipe 102 can be positioned in relation to the color sample 112, and that the light source 101 can be positioned in relation to the light pipe 102 insofar as its axis 116 in relation to the axis 114 and/or the face 122 of the light pipe 102 is concerned, are for all practical purposes infinite. The inventors invented a color measurement device 100 in which the light pipe 102 is positioned in relation to the color sample 112 in a particular way, and in which the axis 116 is positioned in relation to the axis 114 (in the embodiment of FIG. 1) or in which the axis 116 is positioned in relation to the face 122 (in the embodiment of FIG. 2) in a particular way. The end result is that the color measurement device 100 of FIGS. 1 and 2 is very robust with respect to the relative movement of the collection optics 106 vis-à-vis the color sample 112 along the axis 124—that is, with respect to the distance between the optics 106 and the sample 112 varying along the axis 124.

For example, FIG. 3 illustrates that the points 312 can be relatively far apart—that is, the end point coordinates of the field stop 106C can be relatively far apart—while still maintaining a substantially identical area under each of the lines 306, 308, and 310, which is proportional to the power detected by the light detector 108, as has been described. Importantly, the leading slopes of the lines 306, 308, and 310 as the lines 306, 308, and 310 rise from zero illumination, to the left of point 312A, do not have to be precisely characterized or even considered or known in achieving this robustness. Likewise, the lagging slopes of the lines 306, 308, and 310 as the lines 306, 308, and 310 fall to zero illumination, to the right of point 312B, do not have to be precisely characterized or even considered or known in achieving this robustness. As a result, stability in having an equal area under each of the lines 306, 308, and 310 is relatively easily achieved in the color measurement device 100 of FIGS. 1 and 2.

It is noted that the inventors' solutions (i.e., the embodiments of FIGS. 1 and 2) are further unintuitive and nonobvious at least in the following respect. One guiding principle in configuring a color measurement device is to have uniform illumination across the entire surface of the color sample 112 from the perspective of the field stop 106C, as it has been thought that having such uniform illumination provides for better light power measurements. However, the inventors went against convention in this respect, instead inventing better color measurement devices as in FIGS. 1 and 2 that do not provide uniform illumination across the entire surface of the color sample 112 from the perspective of the field stop 106C. That is, as has been described above, the illumination across the color sample 112 between the points 312 that correspond to the opening of the field stop 106C is non-uniform. Nevertheless, better light power measurements result, due to the robustness of the inventors' solutions.

Figure 4:
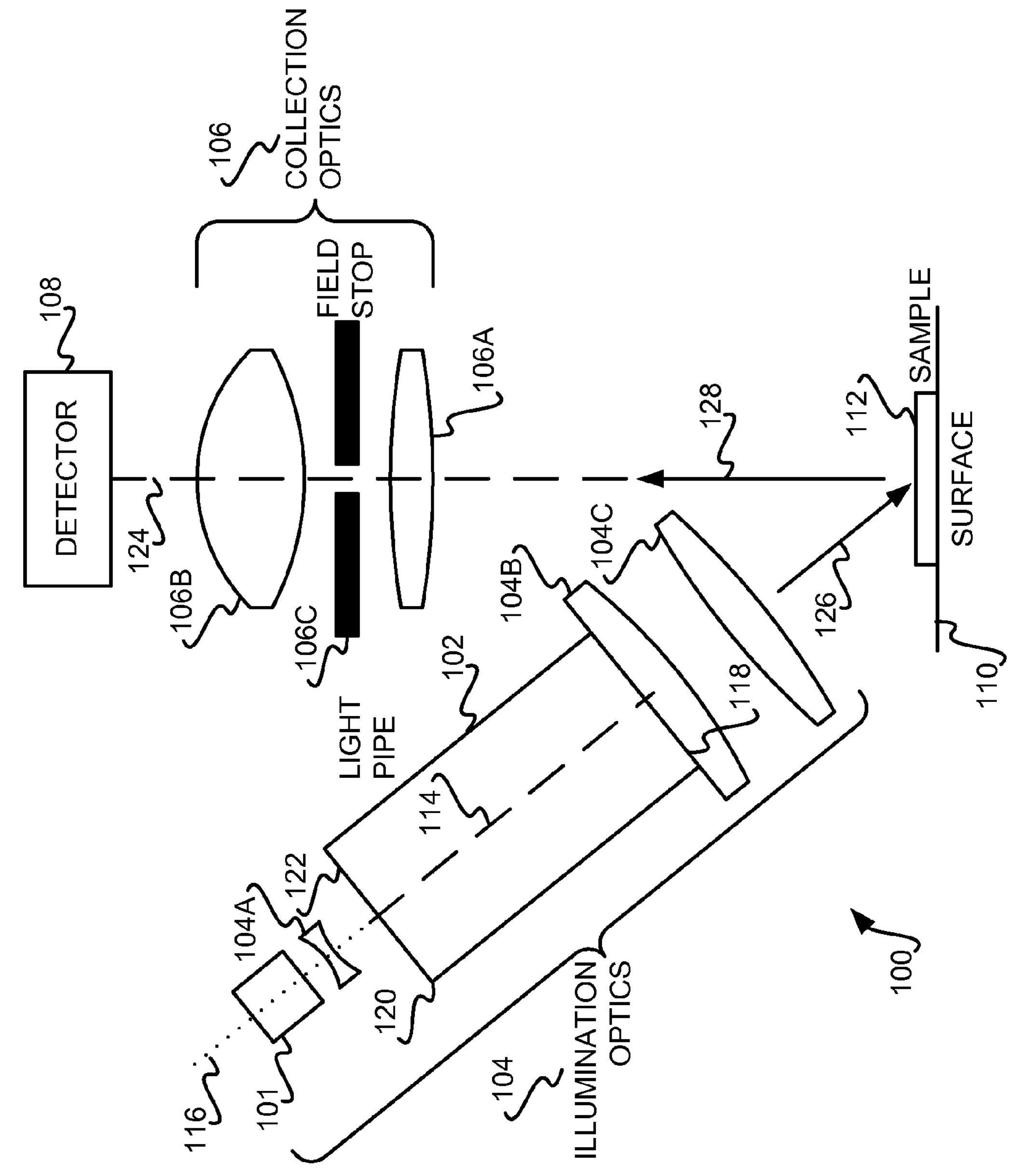
FIG. 4 is a diagram of a color measurement device, according to an approach also considered by the inventors.

For instance, FIG. 4 shows another alternative of the color measurement device 100 that was considered by the inventors. The color measurement device 100 of FIG. 4 is identical to the color measurement device 100 of FIGS. 1 and 2, except as follows. In FIG. 4, the axes 114 and 116 are parallel to one another.

Figure 5:
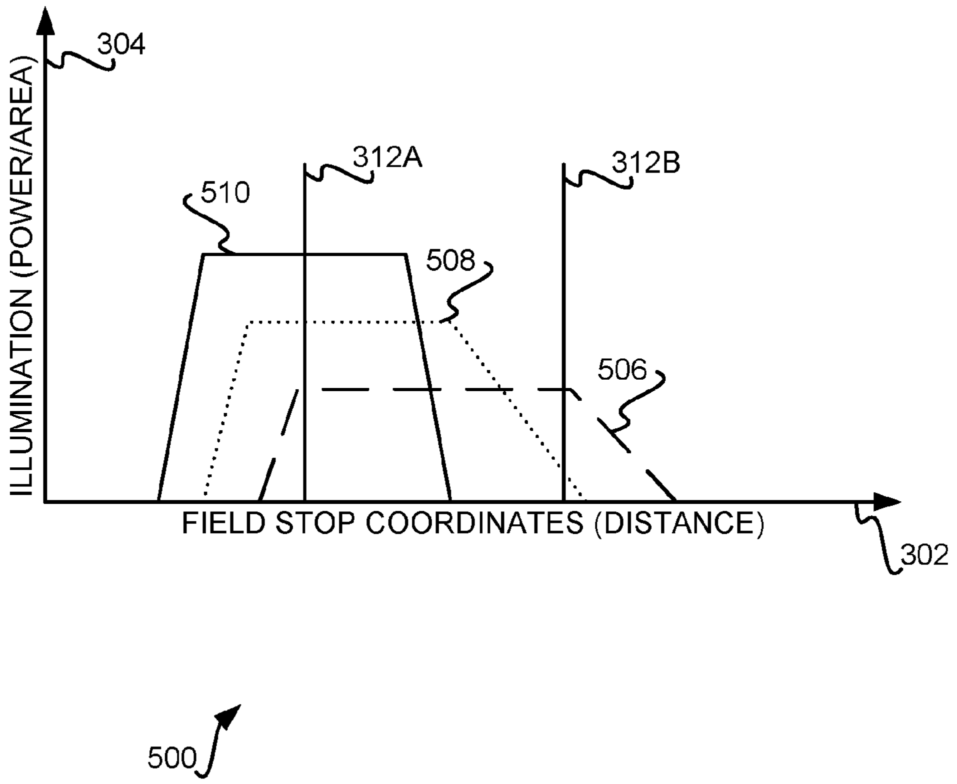
FIG. 5 is a graph depicting uniform illumination of a color sample in accordance with the color measurement device of FIG. 4.

FIG. 5 shows a graph 500 depicting illumination of the color sample 112 as a function of the field stop coordinates with respect to the color measurement device 100 of FIG. 4. The x-axis 302 and the y-axis 304 again denote units of length or distance and units of illumination, as in FIG. 3. There are three lines depicted in FIG. 5: a dashed line 506, a dotted line 508, and a solid line 510, which correspond to the lines 306, 308, and 310 of FIG. 3 in that the lines 506, 508, and 510 correspond to different relative positions of the color sample 112 with respect to the collection optics 106.

The field stop end point coordinates have been shifted in FIG. 5 so that the areas under the lines 506, 508, and 510 are equal to one another. Note, however, that this means the lagging slopes of the lines 506, 508, and 510 have to be precisely characterized, considered, and be known in order to have the light detector 108 detect the same light power regardless of the position of the collection optics 106 vis-à-vis the color sample 112. That is to say, to obtain equal areas under the lines 506, 508, and 510, how the lines 506, 508, and 510 drop to zero illumination has to be precisely characterized, considered, and known. In practice, this is very difficult to achieve, requiring a large amount of variables to be properly balanced and be known: the size and shape of the area on the color sample surface 110 that is illuminated, the field stop end point coordinates, and so on.

Thus, the alternative approach of FIG. 4 considered by the inventors is not as advantageous as the solutions of FIGS. 1 and 2 that the inventors invented. In some respects, however, the desirability of the embodiments of FIGS. 1 and 2 over the approach of FIG. 4 is reached by unintuitive and nonobvious reasoning. As depicted in FIG. 5, for instance, the approach of FIG. 4 in fact provides for uniform illumination across the color sample 112, insofar as the lines 506, 508, and 510 have substantially flat plateaus at their peaks (i.e., they have zero slopes at their peaks). As noted above, a guiding principle in color measurement has been to start with uniform illumination across the entire surface of the color sample 112. If the inventors followed convention, they would have focused on correcting the difficulties with the approach of FIG. 4, instead of coming up with entirely new solutions as in FIGS. 1 and 2.

Figure 6:
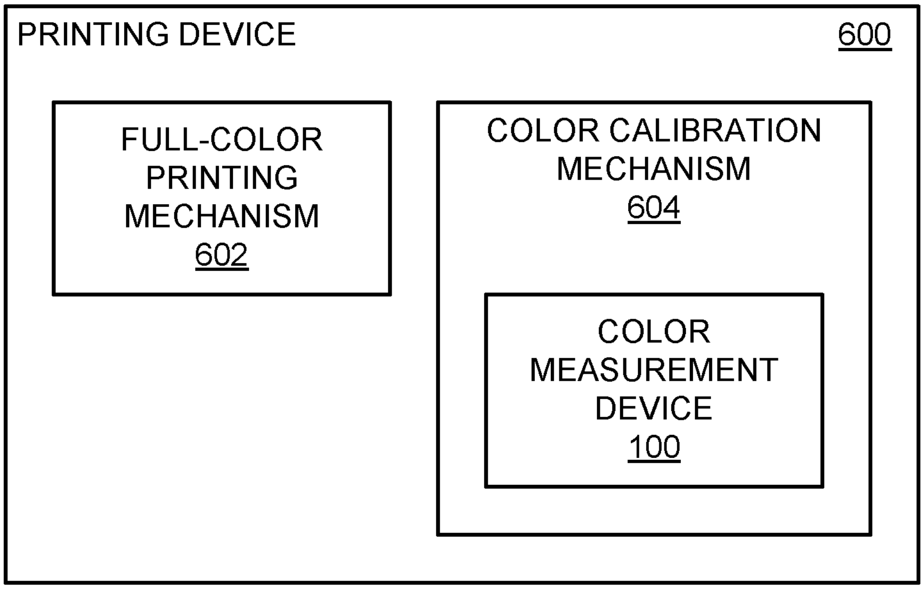
FIG. 6 is a block diagram of a representative printing device, according to an embodiment of the present disclosure.

In conclusion, FIG. 6 shows a rudimentary printing device 600, according to an embodiment of the disclosure. The printing device 600 includes a full-color printing mechanism 602 and a color calibration mechanism 604. The full-color printing mechanism 602 may be a full-color inkjet-printing mechanism, a full-color laser-printing mechanism, or another type of full-color printing mechanism.

The color calibration mechanism 604 calibrates the full-color printing mechanism 602 so that the printing mechanism 602 optimally and accurately prints images on media sheets in full color. For example, the color calibration mechanism 604 may measure the color of various color samples printed by the printing mechanism 602, and thereafter adjust how the printing mechanism 602 outputs these various colors. In this respect, the color calibration mechanism 604 includes the color measurement device 100 of FIG. 1 or FIG. 2 as has been described. The color calibration mechanism 604 can be implemented in hardware, or a combination of hardware and software.

We claim:

1. A color measurement device comprising:

a light pipe oriented length-wise towards a color sample surface along just one first axis that is non-perpendicular to the color sample surface, a color sample positioned on the color sample surface, the light pipe having a near opening and a far opening, the near opening closer to the color sample than the far opening, the light pipe having a face at the far opening;

a light source positioned near the far opening of the light pipe, the light source to generate and output light along a second axis and into the light pipe at the far opening, the light to reflect off the color sample surface after exiting the light pipe at the near opening, the second axis being non-perpendicular to the face of the light pipe at the far opening; and a lens disposed between the light source and the light pipe, wherein the light pipe is an only, unsegmented light pipe within the color measurement device, and the light source is discrete from the light pipe.

2. The color measurement device of claim 1, wherein the light source is positioned near the far opening of the light pipe such that second axis is non-parallel to and non-coincident with the first axis.

3. The color measurement device of claim 2, wherein the face of the light pipe at the far opening is at least substantially perpendicular to the first axis, and the face of the light pipe at the far opening is at least substantially perpendicular to a length of the light pipe.

4. The color measurement device of claim 1, wherein the light non-uniformly illuminates the color sample on the color sample surface after exiting the light pipe at the near opening.

5. The color measurement device of claim 4, further comprising:

collection optics disposed above the color sample surface along a third axis at least substantially perpendicular to the color sample surface, the collection optics comprising one or more lenses and a field stop; and, a light detector disposed above the collection optics to detect the light reflected off the color sample and collected by the collection optics, wherein a power of the light reflected off the color sample and collected by the collection optics is at least substantially independent of a position of the color sample along the third axis in relation to the collection optics.

6. The color measurement device of claim 1, further comprising illumination optics comprising one or more lenses, each lens disposed along one of the first axis and the second axis.

7. A color measurement device comprising:

a light pipe having one or more sidewalls without bends and that are oriented length-wise towards a color sample surface along a first axis that is non-perpendicular to the color sample surface, a color sample positioned on the color sample surface, the light pipe having a near opening and a far opening, the near opening closer to the color sample than the far opening, the light pipe having a face at the far opening;

a light source positioned near the far opening of the light pipe, the light source to generate and output light along a second axis and into the light pipe at the far opening, the light to reflect off the color sample surface after exiting the light pipe at the near opening, the light non-uniformly illuminating the color sample on the color sample surface after exiting the light pipe at the near opening; and a lens disposed between the light source and the light pipe, wherein the light pipe is an only, unsegmented light pipe within the color measurement device, and the light source is discrete from the light pipe.

8. The color measurement device of claim 7, wherein the second axis is non-perpendicular to the face of the light pipe at the far opening.

9. The color measurement device of claim 7, further comprising:

collection optics disposed above the color sample surface along a third axis at least substantially perpendicular to the color sample surface, the collection optics comprising one or more lenses and a field stop; and, a light detector disposed above the collection optics to detect the light reflected off the color sample and collected by the collection optics, wherein a power of the light reflected off the color sample and collected by the collection optics is at least substantially independent of a position of the color sample along the third axis in relation to the collection optics.

10. The color measurement device of claim 7, wherein the light source is positioned near the far opening of the light pipe such that second axis is non-parallel to and non-coincident with the first axis.

11. The color measurement device of claim 10, wherein the face of the light pipe at the far opening is at least substantially perpendicular to the first axis, and the face of the light pipe at the far opening is at least substantially perpendicular to a length of the light pipe.

12. The color measurement device of claim 7, further comprising illumination optics comprising one or more lenses, each lens disposed along one of the first axis and the second axis.

13. A full-color printing device comprising:

a full-color printing mechanism; and, a color calibration mechanism to calibrate the full-color printing mechanism, the color calibration mechanism comprising a color measurement device, the color measurement device comprising:

a light pipe oriented length-wise towards a color sample surface along a first axis that is non-perpendicular to the color sample surface, a color sample positioned on the color sample surface, the light pipe having a near opening and a far opening, the near opening closer to the color sample than the far opening, the light pipe having a face at the far opening, the light pipe having cross-sectional length-wise sidewalls that are parallel to one another along entire lengths thereof;

a light source positioned near the far opening of the light pipe, the light source to generate and output light along a second axis and into the light pipe at the far opening, the light to reflect off the color sample surface after exiting the light pipe at the near opening, the second axis being non-perpendicular to the face of the light pipe at the far opening, the light non-uniformly illuminating the color sample on the color sample surface after exiting the light pipe at the near opening; and a lens disposed between the light pipe and light source, wherein the light pipe is an only, unsegmented light pipe within the color calibration mechanism, and the light source is discrete from the light pipe.

* * * * *